Jan. 16, 1962       M. H. LILL       3,017,154
MOUNTING FOR WHEEL BALANCING DEVICE
Filed Feb. 8, 1960       4 Sheets-Sheet 1
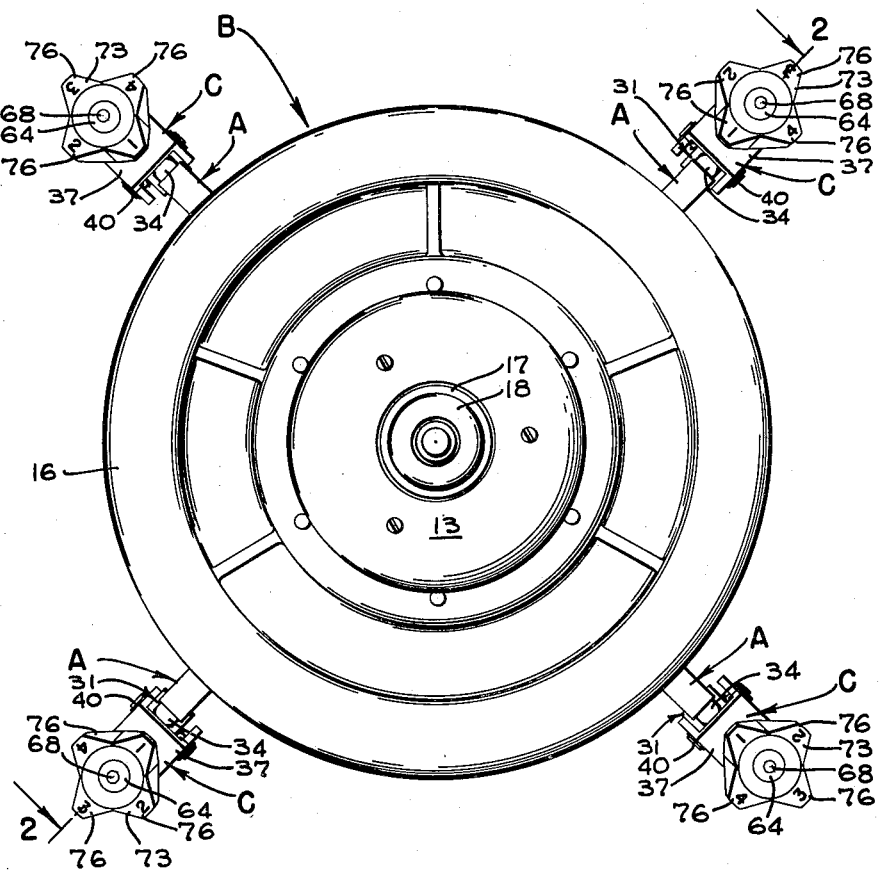
FIG_1
INVENTOR
MELVIN H. LILL
BY Hans G. Hoffmeister
ATTORNEY

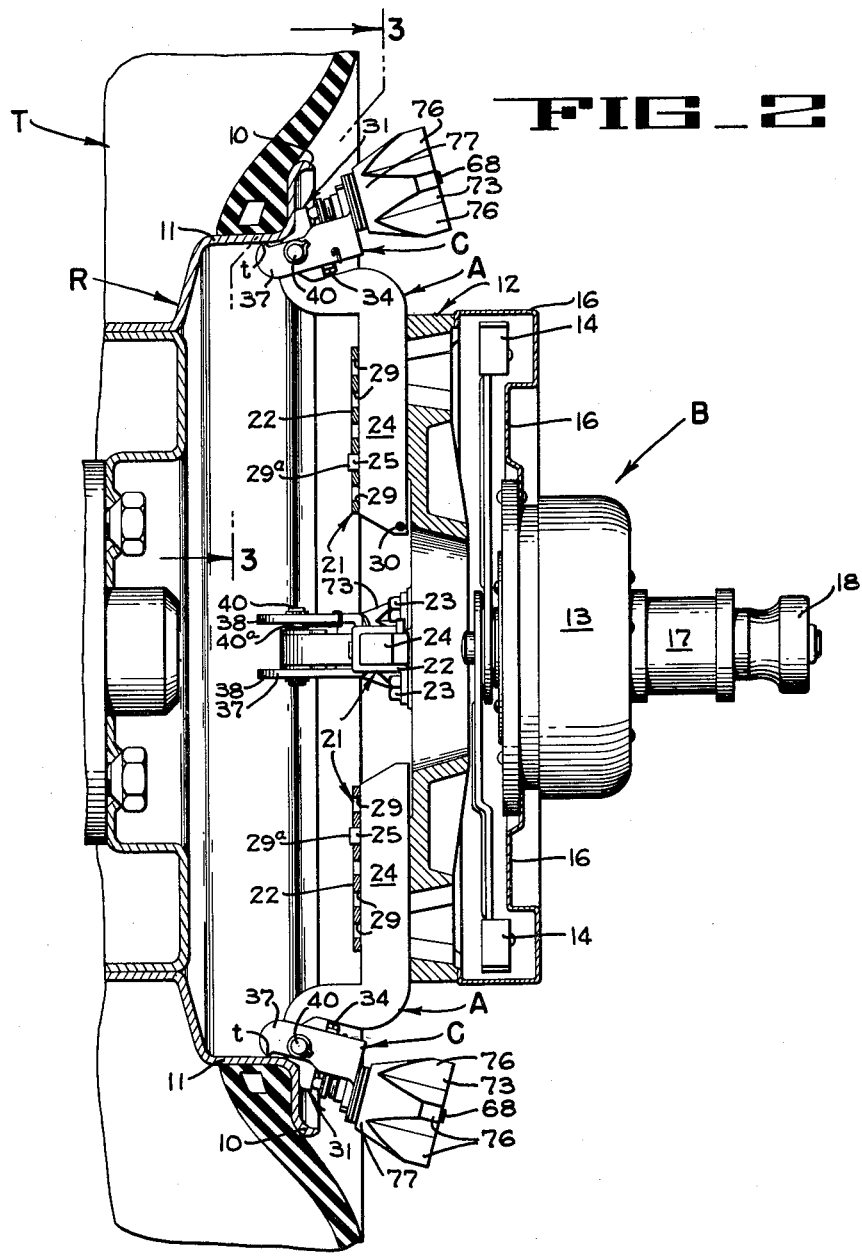

Jan. 16, 1962 M. H. LILL 3,017,154
MOUNTING FOR WHEEL BALANCING DEVICE
Filed Feb. 8, 1960 4 Sheets-Sheet 3
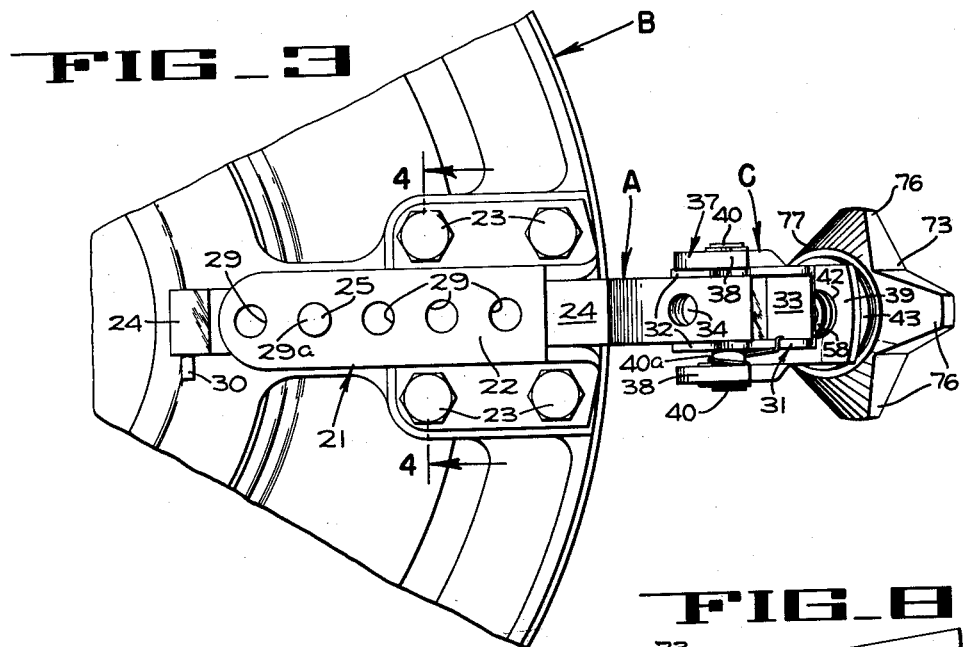
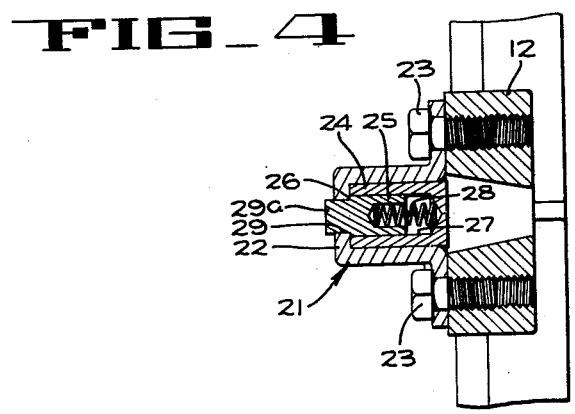
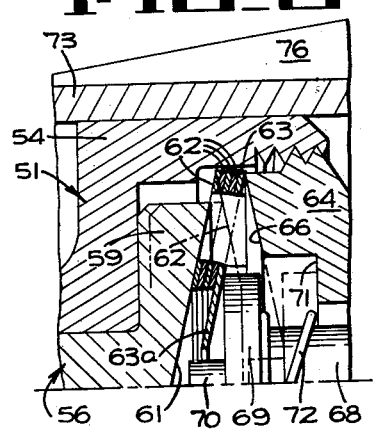
INVENTOR
MELVIN H. LILL
BY *Hans G. Hoffmeister*
ATTORNEY

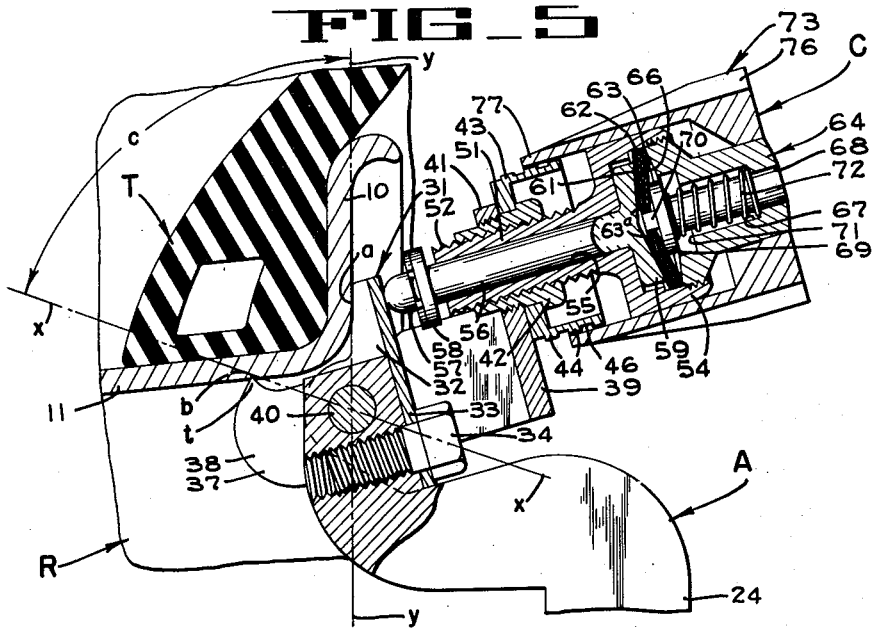
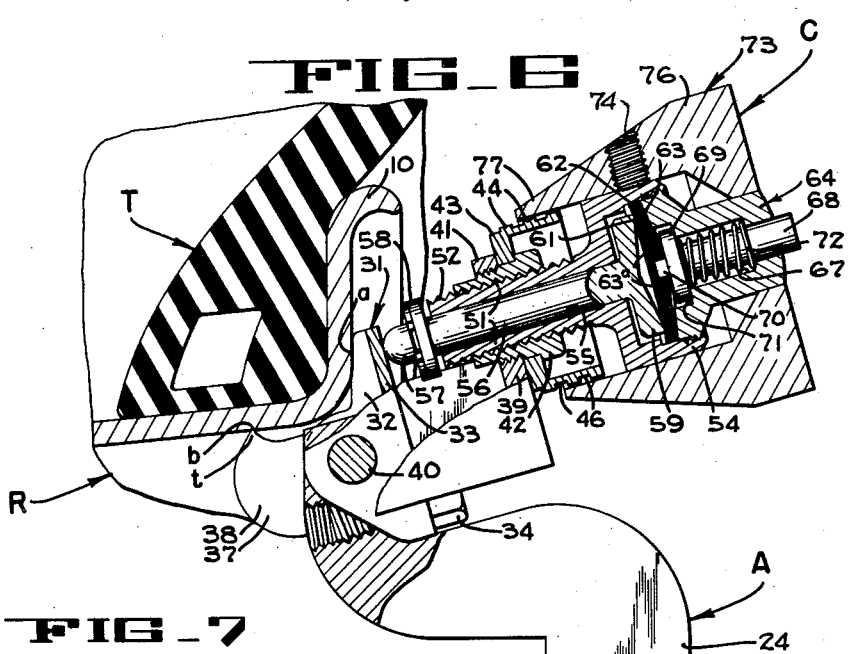
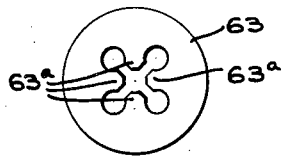
INVENTOR
MELVIN H. LILL

United States Patent Office 3,017,154
Patented Jan. 16, 1962

3,017,154
MOUNTING FOR WHEEL BALANCING DEVICE
Melvin H. Lill, Lansing, Mich., assignor to FMC Corporation, a corporation of Delaware
Filed Feb. 8, 1960, Ser. No. 7,461
11 Claims. (Cl. 248—205)

This invention relates to apparatus for determining the unbalance of a vehicle wheel and is most useful in connection with such apparatus intended for application to the rim of a wheel arranged to receive a pneumatic tire.

In the embodiment of the invention to be described, the apparatus is intended for mounting on the vehicle wheel while the latter is in place on the vehicle, whereupon the wheel is rotated at a relatively high speed and the amount of unbalance of the wheel and tire assembly is determined, for appropriate correction. A device of this type is shown in the patent to Kellogg No. 2,780,939, February 12, 1957, assigned to Food Machinery and Chemical Corporation of San Jose, California. Although it is understood that the mounting structure forming the essential part of this invention may be employed to mount unbalance determining mechanism of any of several known types on a vehicle wheel, an embodiment of the invention will be described in connection with a wheel balancing mechanism of the general nature of that illustrated in the aforesaid Kellogg patent.

When wheel balancers of the type referred to are installed for a test, the vehicle wheels are jacked and rotated at a wheel speed which may correspond to a road velocity as high as 100 miles an hour. Under these conditions it is important that the mounted wheel balancing device have the following characteristics, the attainment of which forms the principal objects of the invention. The device must be firmly retained on the wheel at all expected rates of rotation. The device must be radially centered with the wheel axis. If the device is not so centered, indications of unbalance will be inaccurate, and any tendency of the device to become loose on the wheel during the test will be aggravated. The device must lie in a plane normal to the wheel axis. This further insures accuracy in measurement and minimizes dislodgement forces. The device provides means for giving a clear and accurate indication that the device is both firmly and accurately mounted on the wheel rim. This insures that both safe and accurate results will be obtained when the test is started. The device must have mounting means that is readily adjusted for the various standard rim sizes encountered in the field, and such adjustment must be dependable and rugged.

Before describing in detail the embodiment of the invention selected for illustration, the general nature of the invention in relation to the above requirements will be described briefly.

The unbalance measuring mechanism has a body carrying four brackets in which are four radially slidable mounting arms, ruggedly adjustable for the dimension of the rim at hand. At the end of each arm is a combined rim clamp and micrometer indicator assembly arranged to mount the apparatus by firmly gripping the tire rim at pressure points or zones on the radial side, or tire-retaining, flange of the rim and on the radially inner surface of the tire bead seat, or load bearing flange of the rim. At this point it might be noted that in the United States, for example, in accordance with the standards set up by the American Tire and Rim Association, Inc., the tire bead seat flange of the rim is held to a relatively close tolerance, particularly in regard to concentricity, radial runout and taper. Since the mounting apparatus of this invention precisely centers the balance mechanism relative to the tire bead seat flange, optimum accuracy in centering the apparatus relative to the wheel axis of rotation is obtained.

The rim clamping assembly carried at the outer ends of each arm include a pressure foot for engaging the rim side flange at a first pressure zone and a pivoted jaw for engaging the inner surface of the bead seat flange at a second pressure zone. At the outer end of each jaw is a pair of hardened, sharpened teeth for biting into the metal of the associated rim flange. The locations of the pressure zones relative to the jaw pivot point, is such that when the clamping force is exerted, the jaw teeth tend to approach the pressure zone of the pressure foot on the rim side flange, thereby forceably moving those zones together to force the pressure foot against the rim side flange while the jaw teeth bite into the base flange of the rim. This not only effectively centers the device but prevents dislodgement from the wheel.

The combined clamp and micrometer screw assembly of the invention includes a powerfully preloaded over-center or snap spring that applies force during installation and insures that the teeth on all four jaws bite into the rim flange firmly and by substantially the same degree, so that in addition to the firm mounting action, a radial centering is obtained when the device is properly installed. In addition to this, the combined clamping and micrometer screw assembly gives both a visual and an audible indication when the device is firmly and accurately mounted, thereby relieving the operator of the need for exercising initial judgment or making any measurements or tests before proceeding with the balance test.

The radial arms heretofore mentioned, which are slidable in brackets on the balancer body, are adjustable by means of a captive detent assembly which is strongly constructed and which cannot fall out of place at any time without dismantling the apparatus. Yet the radial adjustment is rapidly effected in use.

The manner whereby these features and advantages characteristic of applicant's invention may be obtained will be apparent to one skilled in the art from the following detailed description and drawings illustrating an embodiment of the invention.

In the drawings:

FIGURE 1 is a front elevation of an appartus embodying the invention before installation on the wheel;

FIGURE 2 is a diametral section of the apparatus installed on a wheel, said section being taken along a line 2—2 of FIGURE 1;

FIGURE 3 is a rear elevation of one of the arm mounting structures, the view being taken looking substantially in the direction indicated by arrows 3, 3 of FIGURE 2;

FIGURE 4 is a transverse section taken on 4—4 of FIGURE 3 showing the arm retaining latch mechanism;

FIGURE 5 is an enlarged radial section showing a clamp assembly mounted on a wheel rim before the final clamping operation if effected;

FIGURE 6 is a view like FIGURE 5 after the clamping operation has been completed;

FIGURE 7 is an elevation of the micrometer screw cup of the indicator guide spring used in the clamping assembly of FIGURES 5 and 6; and FIGURE 8 is an enlarged fragmentary section showing the spring washer mounting, the snap-over position being shown in broken lines.

Referring to FIGS. 1–3 for a general description of the major elements of the illustrated apparatus, the unbalance detecting mechanism is indicated generally at B and, as seen in FIG. 2, it is mounted on a vehicle wheel having a pneumatic tire rim R which carries the usual pneumatic tire T. The rim side flange or tire retaining flange 10 and the tire bead seat or load bearing flange 11 are those parts of the rim employed for mounting the apparatus.

The balancing mechanism illustrated has a body member 12 (FIG. 2) in the form of a generally annular rigid member and the actual balancing mechanism is contained within a cover plate 13 but since details of such mechanism are not critical to the invention, the mechanism is not shown although the balance determining weights 14 appear in FIG. 2. The balance measuring weights 14 are protected by sheet metal cover 16 and, as best seen in FIG. 2, the apparatus includes a weight positioning or adjusting sleeve 17 and a weight value determining knob 18 for manual manipulation during the test as explained in the aforesaid Kellogg patent. In addition to the balancing mechanism, the apparatus includes four radially adjustable mounting arms A, each of which carries adjacent its outer end a rim clamp and micrometer assembly indicated generally at C.

The adjustable arm mounting mechanism includes four radial brackets 21, three of which are shown in FIG. 2. Each bracket is bent to form a channel 22 (FIG. 4) and is bolted to the body 12 by four bolts 23 (FIG. 3). Each radial arm A has a shank portion 24 slidably received in one of the bracket channels 22 and the shank portion carries a spring loaded latch pin 25 having an outwardly facing shoulder 26, the latch pin being mounted in a blind bore 27 in the shank portion of the arm as seen in FIG. 4. A compression spring 28 is disposed in bore 27 and urges the latch pin outwardly. The brackets 21 are formed with a row of apertures 29 spaced radially by distances corresponding to the standard radial differences in rim sizes. As seen in FIG. 4, a reduced diameter head portion 29a of the latch pin 25 may enter a selected bracket aperture 29, whereupon the latch pin shoulder 26 engages the inner face of the bracket under the force of spring 28, locking the arm in the adjusted position. Thus the latch pins cannot escape or be lost and the adjustment of the arms is readily made by depressing the pins with a suitable tool to permit the arms to be slid to their selected positions. As seen in FIG. 3, a keeper pin 30 is driven into the end of each shank portion of the arms so that the arms cannot be accidentally withdrawn from the associated bracket.

The rim clamp mechanism indicated generally at C, includes a pressure foot 31 (FIG. 6) of sheet metal bent to form parallel webs 32 joined by a base portion 33. The base portion is fixed to the end of the associated arm A by a bolt 34. The webs 32 of the pressure foot have curved edges 36 arranged to pressure against the side flange 10 of the tire rim, and thus form part of the mounting and locating means. The other mounting and locating means is in the form of a movable jaw member 37 having side flanges 38 connected by a base portion 39. At the end of each side flange 38 and on the radially outer surface thereof is formed a small hardened tooth t, for biting into the metal of the tire bead seat flange of the rim. Each jaw is pivoted to the associated radial arm A by means of a pivot pin 40 and, as seen in FIG. 3, a small torsion spring 40a surrounds the pin and has one leg snapped over the pressure foot 31 and the other snapped over a flange 38 of the jaw, the spring being arranged to urge the jaw to its retracted position at which the tooth is spaced from the rim flange.

The base 39 of each jaw has an extension portion 41 (FIG. 5) for mounting a combined clamping and micrometer screw assembly C. Threaded into extension 41 of the jaw is a sleeve nut 42 that mounts a cylindrical micrometer indicator barrel 43, formed with a series of exterior annular indicator ribs 44 between which are annular indicator grooves 46. The axial dimensions of the ribs and grooves are the same and correspond to the pitch of the micrometer screw to be described. The micrometer screw, which also serves to supply the clamping force, is indicated generally at 51 and includes a threaded shank 52 which has threads of the same pitch as the width of each rib or groove on the indicator barrel and is threaded into the sleeve nut 42. In the embodiment of the invention illustrated, the pitch of the threads and the rib and groove width is $\frac{1}{16}$ of an inch, and the screw 51 is $\frac{3}{8}$ inch in diameter. The screw 51 has an enlarged end 54 formed in the shape of a cup. The threaded shank 52 of the screw has a through bore 55 in which slides a pressure pin 56 having a rounded end 57 for pressing against the pressure foot 31. The pin 56 is retained against removal by a snap ring and washer assembly 58 (FIG. 5). The outer end of each pressure pin 56 has an enlarged head 59 fitting in the cup 54 on the end of the screw.

The outer face 61 of the head 59 of the pin is concave and conical. Complementary to the concave face of the pin is an over-center or snap spring washer assembly which includes four normally concave spring washers 62 and an outer concave indicator guide washer 63 which, as seen in FIG. 7, has a central portion formed with fingers 63a that extend radially inwardly from the four snap spring washers 62. The spring washers are retained in the cup 54 of the micrometer screw by a cap nut 64 threaded into the cup and having a concave face 66 facing the snap washers. The outer edges of the washers are not peripherally clamped between the cap nut 64 and the cup 54. It is important to note that the periphery of head 59 of pressure pin 56 which periphery forms a circular line of pressure engagement with the spring washers, is spaced radially inwardly of the peripheral portion of the concave face 66 of cap nut 64. The periphery of concave face 66 on the cap nut forms another circular line of pressure engagement with the spring washers. Thus force exerted on pin 56 by turning of cup 54 exerts a cantilever snapover force on the spring washers. Since the spring washers 63 are not clamped against cup 54, a small axial clearance is provided between the peripheral portions of the spring washers and those of the cap nut and cup, to accommodate the snap-over action of the washers.

The cap nut has a stepped bore 67 to receive the shank 68 of an indicator pin, which shank extends completely through the cap nut to give a visual indication of its axial position. The inner end of the indicator pin is provided with an annual flange 69 from which projects an extension 70 that extends within the four fingers 63a of the outer conical washer 63. The cap nut 64 is recessed at 71 to receive the head of the indicator pin. A coil spring 72 keeps the indicator spring pressed against washer 63.

A knob 73, for manipulating the clamp screw, is firmly but adjustably fixed to the cup portion 54 of the screw, by means of one or more set screws 74 (FIG. 6) threaded into radial wings 76 formed on the knob. The knob has a skirt 77, the edge of which moves along the ribs and grooves of the indicator barrel to give a coarse indication of the axial position of the screw. The wings 76 not only provide grips on the knob for tightening the clamp, but they indicate the rotative position of the knob and so provide a fine indication of the position of the screw. Accordingly, the wings are numbered 1–4 as indicated in FIG. 1. Since the pitch of the screw is $\frac{1}{16}$ of an inch, one full revolution of the knob will advance or retract the screw an axial distance equal to the $\frac{1}{16}$ inch width of one of the ribs 44 or grooves 46 on the barrel, and a quarter turn of the knob as indicated by the indicia on its wings represents an advance of $\frac{1}{64}$ inch or about .015 inch. Since the wings can be adjusted so that their rotative positions are all correspondingly disposed when the skirts 77 overlie the same rib or groove on the barrel, and since rotative disposition of the wings can readily be effected by visual inspection within about $\frac{1}{16}$ inch of a turn of the knobs, this arrangement makes possible an adjustment of the micrometer screws to final axial positions which can be all the same within a tolerance as low as $\frac{1}{1000}$ of an inch.

In the construction being described, the length of the spring washer portions disposed between the periphery of pin head 59 and the periphery of the concave face 66 of cap nut 64, coupled with the strength or spring rate of the spring washers, determines the snap-over force. Since the radial distance between these two circular zones or lines of engagement is small, a considerable force is required to cause the springs to snap over. In the embodiment described, the over center or snap spring washers 62 are calibrated or selected to provide a resistance in the order of 275 pounds of force, before the spring washers will snap over center under clamping pressure. Thus it can be seen that by matching the spring rates of the spring washers in all assemblies, and by properly assembling the knobs on the screw cups, a series of clamp assemblies is provided wherein each pressure pin can be brought physically to the same position as those of other clamp assemblies, by observance of the indicators provided. Such position will also result in the exertion of substantially the same calibrated spring force by each pressure pin. This produces correspondingly equal bites of the various jaw teeth into the rim flange.

As illustrated in FIGS. 6 and 8, when the reaction against the pressure pin in the clamp screw exceeds the calibrated snap-over force of the over-center spring washers, the head 59 of the pin will cause the spring washers to snap over center, against the opposed conical face 66 of the cap nut. This action which occurs suddenly, will give both an audible indication as well as a visual indication, because the indicator pin 68 will now be extended outwardly through the bore in the cap nut and will project past the face of the nut. The spring fingers 63a (FIG. 7) on spring 63 that engage the head of the indicator pin 68, insure that the indicator pin will be carried over with the springs, and the recess 71 in the cap nut is deep enough to fully receive flange 69 so as to insure that the full spring will be transmitted directly from the concave face 66 of cap nut 64 through the springs, to the head of the pressure pin.

The installation of the apparatus and operation of the clamping mechanism will now be described in detail. The first step is that of adjusting the position of the radial arms A for the rim size at hand, which is done by freeing the latch pins 25 and sliding the arms to the selected position as previously mentioned. The adjusting knobs are backed off to expose the outermost annular barrel rib 44 at the inner end of the knob skirt. The surfaces of the grooves and the surfaces of the ribs are preferably given finishes of different colors for ready identification. This outermost position of the knob will correspond approximately to that wherein the pressure pin retaining washer assembly 58 engages the end of the clamp screw 51. The balance mechanism is placed against the wheel with two of the arms vertically disposed and two of them horizontally disposed. The balancer is pressed against the wheel so that all four of the pressure feet 31 firmly engage the side flange 10 of the rim. While the balancer is held firmly in this position, the knobs on the two horizontally disposed arms are tightened uniformly and evenly until the teeth t on the respective jaws engage the bead seat flange 11 sufficiently to hold the balancer in position on the rim and center it radially in one plane, but this tightening is not carried to a point whereby the balancer cannot be laterally shifted slightly by the clamp on the other two arms. The wheel is now turned 90°, it being understood that, in a balancing operation of this type, the wheels are jacked up from the floor. The other pair of knobs are tightened uniformly and evenly but now the tightening continues until one of the indicator pins 68 snaps outwardly through the cap nut (FIG. 6), which action is accompanied by an audible clicking sound. Tightening of both knobs continues uniformly and evenly until the opposite indicator pin snaps out. Since the first two knobs mentioned were not completely tightened, this operation continuously centers the balancer on the wheel rim in a plane 90° from that of the first pair of knobs. After the indicators in both knobs have snapped out, as described above, note is made of the number of the radially innermost wing of the latter knob, and the corresponding wing of the other knob is brought into the same radial position relative to the axis of the wheel, thereby insuring that both screws have been very accurately positioned and occupy the same relative position in their respective clamp assemblies. When this is completed the other two knobs, that is, those that were given an initial tightening, are also tightened uniformly and evenly until first one and then the other indicator pins snap, and at this time the skirts on the knobs should overlie the corresponding barrel rings or grooves, and the knob wings should be turned so that their indicia point in the same direction as do those of the other pair. In some cases, both indicator pins in a pair of knobs that are being tightened will be projected simultaneously, or at the same relative knob position. The apparatus is now ready for use and the amount of unbalance and its location can be determined by spinning the wheel in any accepted manner while manipulating knobs 17 and 18 as described in the aforesaid Kellogg patent.

The internal action of the clamping assembly will now be explained in somewhat more detail with reference to FIGS. 5, 6 and 8. First, as indicated in FIG. 5, each pressure foot 31 engages a rim side flange 10 at a point or zone indicated at "a." An imaginary line y—y can be drawn through point "a" and the center of the pivot pin 40. Similarly, the teeth t on each jaw will have bitten into the metal of the tire bead seat flange 11 at a point "b" and an imaginary line x—x can be drawn through point "b" and the center of pivot pin 40. It can be seen that the included angle "c" between the imaginary lines y—y and x—x is less than 90°. The geometry of this arrangement is such that as the clamp is tightened, causing the jaws to pivot relative to the pressure feet, teeth t of the jaws approach the zones of engagement "a" of the pressure feet with the rim side flange, and this produces a powerful clamping action thereby pressing the pressure feet 31 firmly against the rim side flange at zones "a." Also, since the hardened teeth t, under the powerful force of the calibrated snap springs in the micrometer screw assembly, have penetrated partially into the tire bead seat flange 11, axial dislodgement of the balancer assembly during the test is effectively prevented.

Since the over-center springs are selected or calibrated to exert substantially the same force before they snap from the position shown in FIG. 5 to that shown in FIG. 6, (see also FIG. 8) the amount with which the teeth on each jaw penetrate or bite into the material of the rim flange will be substantially the same, and the balancer will be precisely centered on the rim.

When the spring washers snap over against the conical face 66 of the cap nut (see FIG. 8) the spring force exerted against the head of the pressure pin is slightly relieved and the head moves back slightly relative to the cup. However, the spring washers still press against the cup, and furthermore this slight relative motion of the pin and cup (in the order of a few thousandths of an inch) does not relieve the clamping force to any significant degree. When the knobs were tightened, the resistance of the spring washers caused a springing or deflection of the various parts of the clamp assembly, under both tension and compressive loads. At snap-over, the slight relative motion that occurs between the pressure pin and the cup is not enough to relieve any substantial part of this resilient, loading deflection of the clamping assembly parts, so that even if nothing more were done, the balancer would be safely mounted.

However, a final adjustment after snap-over is made in order to bring all micrometer screws to the same relative positions. Such final adjustment presses the concave face 66 of the cap nut 64 against the over-center springs and transmits force directly through the springs to the periphery of the head 59 of the pressure pins. Thus final adjustment also restores the slight relaxation or spring back that occurred at snap-over and the teeth of each jaw remain as firmly seated in the slight indentations as before. In other words, the action is a positive one after the springs have snapped over-center, but even so the micrometer features of the device make sure that no one clamp is favored or turned more than any other, so that the device remains not only centered, but firmly and safely mounted on the wheel.

The force exerted by the springs after they have been snapped to their over-center position may not be the same as the initial force required to bring them into this condition, and in fact is usually less. But this is immaterial because the more powerful snap force has preformed the seats or indentations in the rim for jaw teeth *t*, and as mentioned this force is not materially relieved at snap-over. Furthermore, the teeth are always restored to at least their outermost fully seated position in their preformed seats after snap-over by the final tightening, during which the cap nut, spring washers, and the head of the pressure pin, move solidly together for a small distance. This structure therefore, has the advantage of a positive final engagement of the clamp parts, but yet provides indication that prevents an over tightening of any one of the knobs. If the above operating procedure is followed, all knobs will be eventually positioned at the same relative positions on the arms that mount them.

While a particular embodiment of the present invention has been shown and described, it will be understood that the device is capable of modification and variation without departing from the principles of the invention and that the scope of the invention should be limited only by the scope and proper interpretation of the claims appended hereto.

The invention having thus been described, that which is believed to be new and desired to be protected by Letters Patent is:

1. Apparatus for determining the unbalance of a wheel comprising an unbalance determining mechanism body, means for mounting said body on the wheel rim, said mounting means comprising four equally spaced radially adjustable mounting arms extending from said body, said arms each terminating in a rim clamping assembly, each rim clamping assembly comprising a foot on the associated arm having a generally radial clamping surface for pressing against the rim side flange, a jaw extending generally axially of the wheel rim, a pivot for said jaw adjacent the end of said arm and disposed radially inwardly of the rim engaging portion of said foot, a hard, sharp tooth on said jaw disposed axially inwardly of said foot for engaging and biting into the radially inner surface of the rim bead seat flange, and clamp means mounted between said jaw and said foot for pivoting said jaw to move the tooth on said jaw radially outwardly for pressure engagement with said rim bead seat flange, the included angle between a line defined by the pivot axis and the zone of engagement of said foot with the rim side flange, and a line defined by the pivot axis and said jaw tooth at its zone of engagement with the rim bead seat flange being less than 90°, so that actuation of said clamp means simultaneously urges said jaw tooth radially outwardly to bit into the rim bead seat flange and forces said foot axially inwardly tightly against the rim side flange.

2. Apparatus for determining the unbalance of a wheel comprising an unbalance determining mechanism body, means for mounting said body on the wheel rim, said mounting means comprising four equally spaced mounting arms extending generally radially from said body, said arms each terminating in a rim clamping assembly, each rim clamping assembly comprising a foot on the associated arm having a generally radial clamping surface for pressing against the rim side flange, a U-shaped jaw extending generally axially of said rim and having spaced flanges, a pivot for said jaw adjacent the end of said arm and disposed radially inwardly of the rim engaging portion of said foot, a hard, sharp tooth on the end of each flange of said jaw disposed axially inwardly of said foot for engaging and biting into the radially inner surface of the rim bead seat flange, and clamp means mounted between said jaw and said foot for pivoting said jaw to move the teeth on said jaw radially outward from pressure engagement with said rim bead seat flange, the included angle between a plane defined by said pivot and the zone of engagement of said foot with the rim side flange, and a plane defined by said pivot and said jaw teeth at their zones of engagement with the rim bead seat flange being less than 90°, so that actuation of said clamp means simultaneously urges said jaw teeth radially outwardly to bit into the rim bead seat flange and forces said foot axially inwardly tightly against the rim side flange.

3. Apparatus for determining the unbalance of a wheel comprising an unbalance determining mechanism body, means for mounting said body on the wheel rim, said mounting means comprising four equally spaced mounting arms extending generally radially from said body, said arms each terminating in a rim clamping assembly, each rim clamping assembly comprising a foot on the associated arm for pressing against the rim side flange, a U-shaped jaw having spaced flanges extending generally axially of said rim, a pivot for the flanges of said jaw adjacent the end of said arm and disposed radially inwardly of the rim engaging portion of said foot, a tooth on the end of each flange of said jaw disposed axially inwardly of said foot for engaging the radially inner surface of the rim bead seat flange, and clamp screw means threadedly mounted on the base of said jaw and engaging said foot for pivoting the teeth on said jaw radially outward for pressure engagement with said rim bead seat flange, the included angle between a plane defined by said pivot and the zone of engagement of said foot with the rim side flange, and a plane defined by said pivot and said jaw teeth at their zones of engagement with the rim bead seat flange being less than 90°, so that actuation of said clamp means simultaneously urges said jaw teeth radially outwardly to bite into the rim bead seat flange and forces said foot axially inwardly tightly against the rim side flange.

4. Apparatus for determining the unbalance of a wheel comprising an unbalance determining mechanism body, means for mounting said body on the wheel rim, said mounting means comprising four equally spaced mounting arms extending generally radially from said body, said arms each terminating in a rim clamping assembly, each rim clamping assembly comprising a foot member on the associated arm having a generally radial clamping surface for pressing against the rim side flange, a jaw member extending generally axially of said rim, a pivot for said jaw member adjacent the end of said arm and disposed radially inwardly of the rim engaging portion of said foot member, a hard, sharp tooth on said jaw member disposed axially inwardly of said foot member for engaging and biting into the radially inner surface of the rim bead seat flange, and clamp screw means threaded into one of said members and disposed for pressure engagement with the other of said members for pivoting said jaw member in a direction to move the tooth thereon radially outwardly into biting engagement with the rim bead seat flange.

5. Apparatus for determining the unbalance of a wheel comprising an unbalance determining mechanism body, means for mounting said body on the wheel rim, said mounting means comprising four equally spaced mounting arms extending generally radially from said body, said arms each terminating in a rim clamping assembly, each rim clamping assembly comprising a foot member on the associated arm for pressing against the rim side flange, a jaw member extending generally axially of said rim, a pivot for said jaw member adjacent the end of said arm and disposed radially inwardly of the rim engaging portion of said foot member, a tooth on said jaw member disposed axially inwardly of said foot for engaging the radially inner surface of the rim bead seat flange, combined micrometer indicator and clamp means comprising a micrometer screw threaded into one of said members, said screw including operator means for turning said screw, clamp pressure exerting means movably mounted in said screw for pressure engagement with the other of said members, calibrated snap spring means between said screw and said clamp pressure exerting means for transmitting force from said screw to said clamp pressure exerting means, cooperating screw position indicator means on said screw and on said one member into which the screw is threaded, and visual indicator means for actuation by relative motion of said pressure exerting means and said screw when said snap spring means snaps into a new position under a predetermined clamping force.

6. Apparatus for determining the unbalance of a wheel comprising an unbalance determining mechanism body, means for mounting said body on the wheel rim, said mounting means comprising a plurality of equally spaced mounting arms extending generally radially from said body, said arms each terminating in a rim clamping assembly, each rim clamping assembly comprising a foot member for pressing against the rim side flange, a jaw member extending generally axially of said rim, a pivot for said jaw member adjacent the end of said arm and disposed radially inwardly of the rim engaging portion of said foot member, a tooth on said jaw member disposed axially inwardly of said foot member for engaging the radially inner surface of the rim bead seat flange, combined micrometer indicator and clamp means comprising a micrometer screw threaded into one of said members, said screw including operator means for turning said screw, a clamp pressure pin slidably mounted in said screw for pressure engagement with the other of said members, a head on said pin having an outwardly facing concave face, said screw having a cavity therein with a concave wall facing the concave face on the head of said pin, generally concave snap spring means normally engaging the concave face of said pin head and extending radially past said head into engagement with said cavity wall of the screw, cooperating screw position indicator means on said screw operator means and said one member in which the screw is threaded, and visual indicator means for actuation by relative motion of said pressure pin and said screw when said snap spring means snaps into a new position against the concave wall on said screw under a predetermined clamping force.

7. Apparatus for determining the unbalance of a wheel comprising an unbalance determining mechanism body, means for mounting said body on the wheel rim, said mounting means comprising a plurality of equally spaced mounting arms extending generally radially from said body, said arms each terminating in a rim clamping assembly, each rim clamping assembly comprising a foot member for pressing against the rim side flange, a jaw member, a pivot for said jaw member adjacent the end of said arm and disposed radially inwardly of the rim engaging portion of said foot member, a tooth on said jaw member disposed axially inwardly of said foot member for engaging the radially inner surface of the rim bead seat flange, combined micrometer-indicator and clamping means comprising a micrometer screw threaded into one of said members, said screw including operator means for turning said screw, a clamp pressure pin slidably mounted in said screw for pressure engagement with the other of said members, a head on said pin having an outwardly facing concave face, said screw having a cavity therein with a concave wall facing the concave face on tthe head of said pin, generally concave snap spring means normally engaging the concave face of said pin head and extending radially past said head into engagement with said cavity wall of the screw, cooperating screw position indicator means on said screw operator means and said one member in which the screw is threaded, an axial bore in said screw cavity wall, and a pin extending through said bore and into engagement with snap spring means.

8. Apparatus for determining the unbalance of a wheel comprising an unbalance determining mechanism body, means for mounting said body on the wheel rim, said mounting means comprising a plurality of equally spaced mounting arms extending generally radially from said body, said arms each terminating in a rim of clamping assembly, each rim clamping assembly comprising a foot member for pressing against the rim side flange, a jaw member, a pivot for said jaw member adjacent the end of said arm and disposed radially inwardly of the rim engaging portion of said foot member, a tooth on said jaw member disposed axially inwardly of said foot member for engaging the radially inner surface of the rim bead seat flange, combined micrometer-indicator and clamp means comprising a micrometer screw threaded into one of said members, a screw position indicator barrel on said member having annular indicator rings, a knob on said screw having a skirt overlying said barrel, a clamp pressure pin slidably mounted in said screw for pressure engagement with the other of said members, snap spring means between said screw and said pressure pin for urging said pin toward said other member, and visual indicator means for actuation by relative motion of said pressure pin and said screw when said snap spring means snaps into a new position under a predetermined clamping force.

9. Apparatus for determining the unbalance of a wheel comprising an unbalance determining mechanism body, means for mounting said body on the wheel rim, said mounting means comprising four equally spaced mounting arms extending generally radially from said body, each of said arms terminating in a rim clamping assembly, each rim clamping assembly comprising a foot member on the associated arm for pressing against the rim side flange, a jaw member extending generally axially of said rim, a pivot for said jaw member adjacent the end of said arm and disposed radially inwardly of the rim engaging portion of said foot member, a tooth on said jaw member disposed axially inwardly of said foot for engaging the radially inner surface of the rim bead seat flange, combined micrometer indicator and clamp means comprising a micrometer screw threaded into one of said members, said screw including operator means for turning said screw, clamp pressure exerting means movably mounted in said screw for pressure engagement with the other of said members, calibrated snap spring means between said screw and said clamp pressure exerting means, and cooperating screw position indicator means on said screw and on said one member into which the screw is threaded.

10. Apparatus for determining the unbalance of a wheel comprising an unbalance determining mechanism body, means for mounting said body on the wheel rim, said mounting means comprising four equally spaced mounting arms extending generally radially from said body, said arms each terminating in a rim clamping assembly, each rim clamping assembly comprising a foot member having a generally radial clamping surface on the associated arm for pressing against the rim side flange, a jaw member extending generally axially of said rim, a pivot for said jaw member adjacent the end of said arm and disposed radially inward of the rim engaging portion of said foot member, a hard sharp tooth on said jaw member disposed axially inwardly of said foot member for engaging and biting into the radially inner surface of the rim bead seat flange, clamp screw means threaded into one of said members and disposed for pressure engagement with the other of said members for pivoting said jaw member in a direction to move the tooth thereon radially outward into biting engagement with the rim bead seat flange, and cooperating screw position indicator means on said screw and on said one member into which the screw is threaded.

11. A test instrument for mounting on a wheel rim comprising a test mechanism body, means for mounting said body on the wheel rim, said mounting means comprising equally spaced mounting arms extending generally radially from said body, each of said arms terminating in a rim clamping assembly, each rim clamping assembly comprising a foot member on the associated arm for pressing against the rim side flange, a jaw member extending generally axially of said rim, a pivot for said jaw member adjacent the end of said arm and disposed radially inwardly of the rim engaging portion of said foot member, a tooth on said jaw member disposed axially inwardly of said foot for engaging the radially inner surface of the rim bead seat flange, clamp means comprising a screw threaded into one of said members, said screw including operator means for turning said screw, clamp pressure exerting means movably mounted in said screw for pressure engagement with the other of said members, calibrated snap spring means between said screw and said clamp pressure exerting means for applying a predetermined load to said jaw member when said screw is tightened.

References Cited in the file of this patent
UNITED STATES PATENTS

| | | |
|---|---|---|
| 1,239,595 | Hawthorne | Sept. 11, 1917 |
| 2,680,974 | Hunter | June 15, 1954 |
| 2,927,760 | Carrigan | Mar. 8, 1960 |